(No Model.) 8 Sheets—Sheet 1.

T. URDAHL, Dec'd.
H. T. Lerdall & M. Johnson, Executors.
STRAW BINDER.

No. 467,507. Patented Jan. 26, 1892.

Witnesses
Geo. W. Young
Wm Klug

Inventor
Thomas Urdahl
Herman T. Lerdall (deceased)
Michael Johnson } Executors
By H. G. Underwood
Attorney

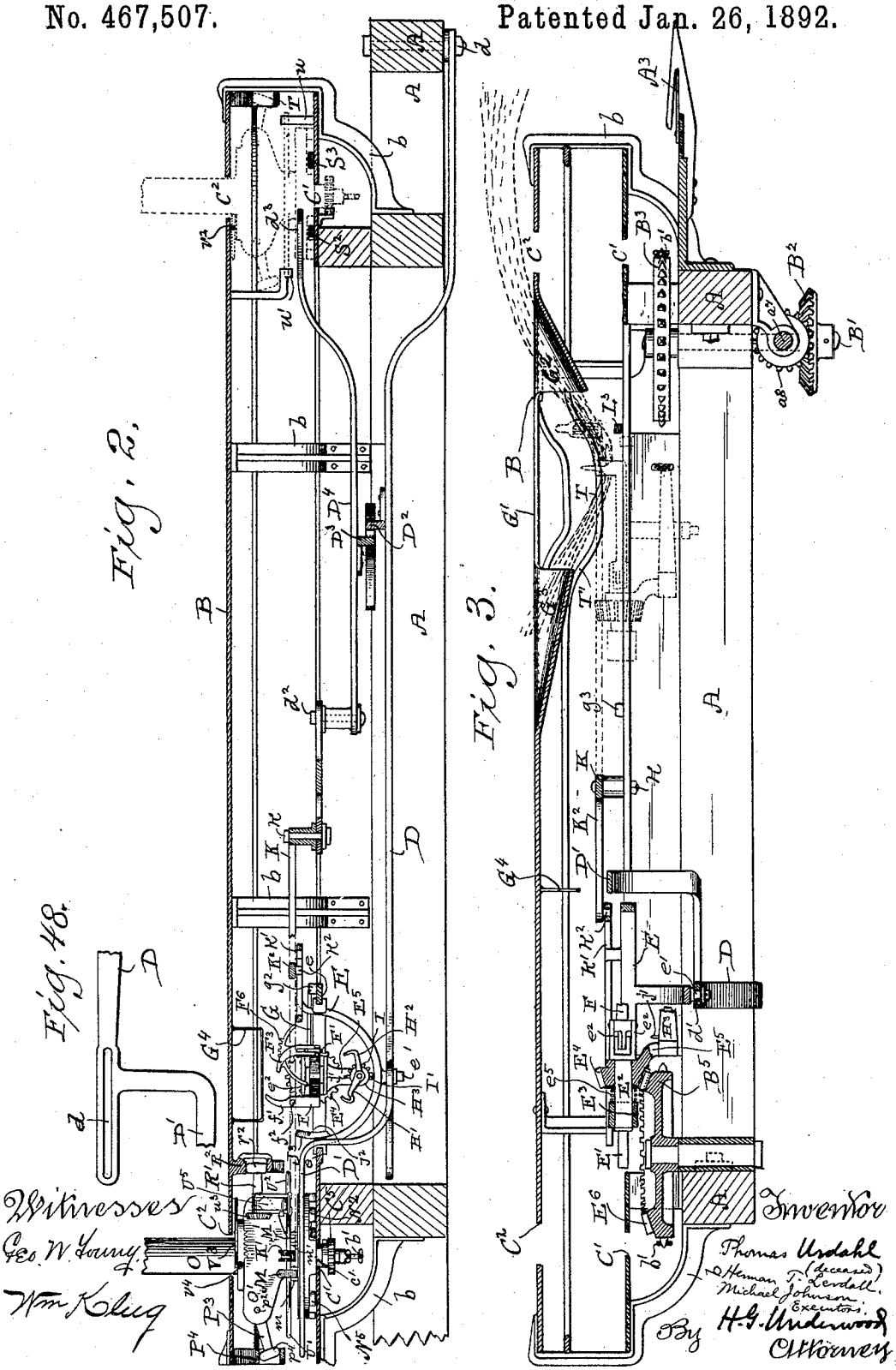

(No Model.) T. URDAHL, Dec'd. 8 Sheets—Sheet 3.
H. T. LERDALL & M. JOHNSON, Executors.
STRAW BINDER.

No. 467,507. Patented Jan. 26, 1892.

Witnesses
Geo W Young.
Wm K Long

Inventor
Thomas Urdahl (deceased)
Herman T. Lerdall
Michael Johnson Executors
By H. J. Underwood
Attorneys (No Model.) 8 Sheets—Sheet 4.
T. URDAHL, Dec'd.
H. T. LERDALL & M. JOHNSON, Executors.
STRAW BINDER.
No. 467,507. Patented Jan. 26, 1892.
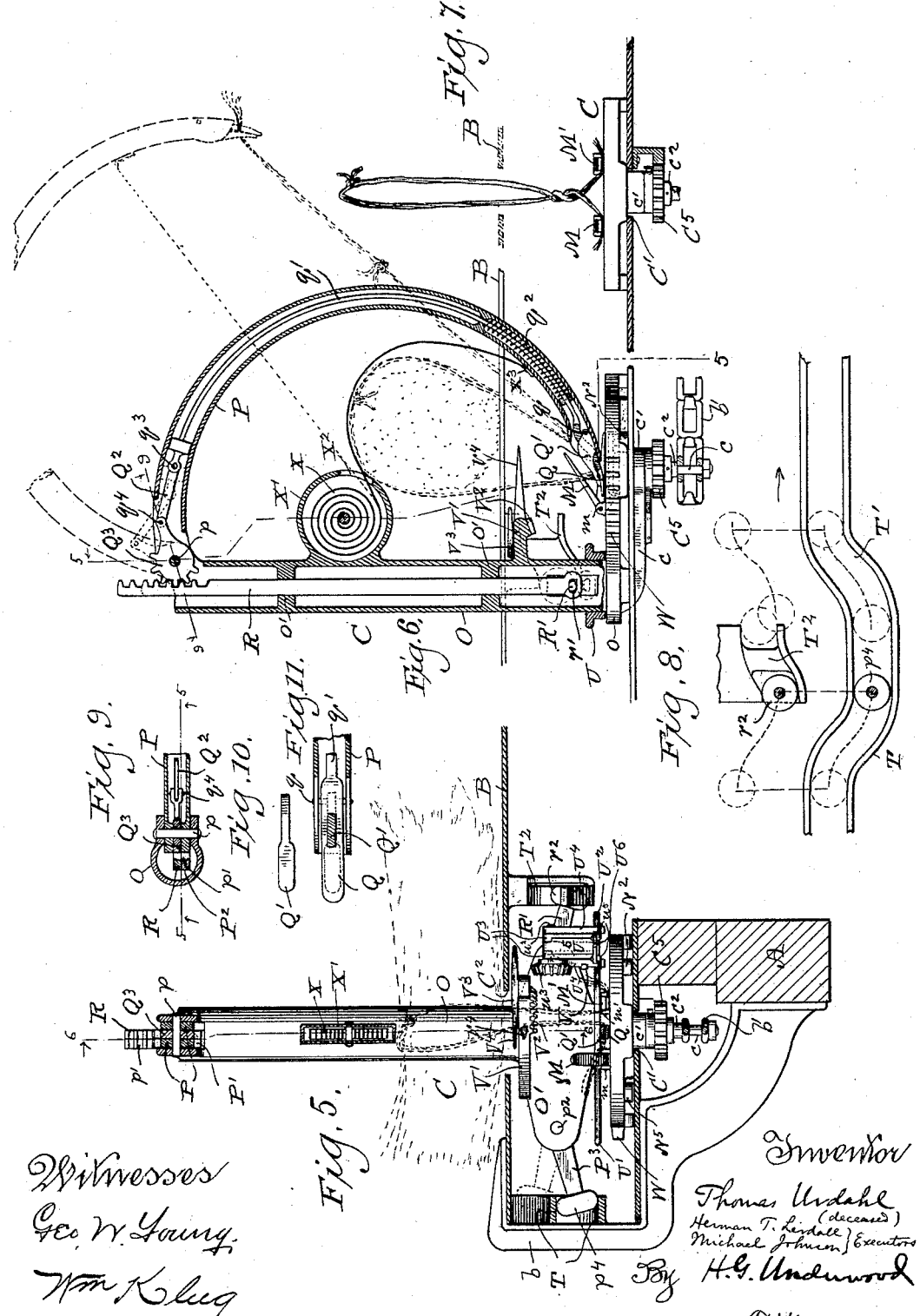

(No Model.) 8 Sheets—Sheet 5.
T. URDAHL, Dec'd.
H. T. LERDALL & M. JOHNSON, Executors.
STRAW BINDER.
No. 467,507. Patented Jan. 26, 1892.
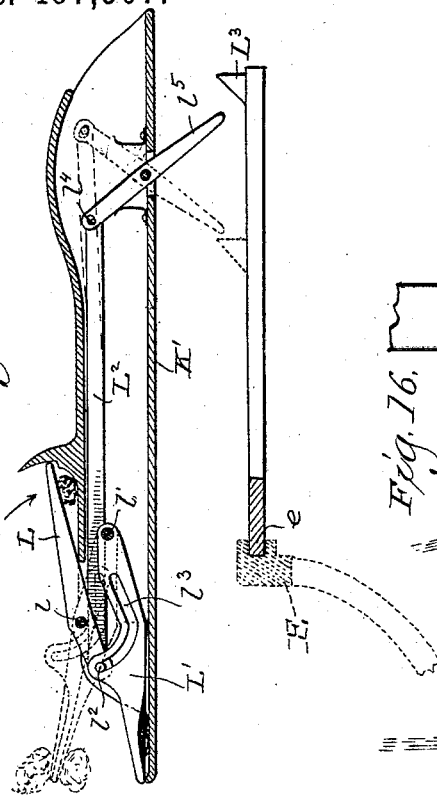
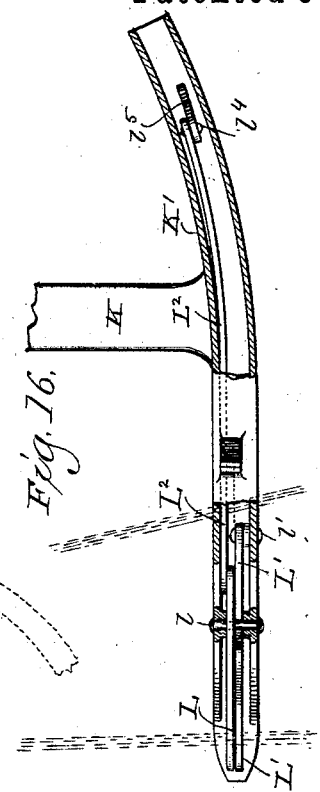
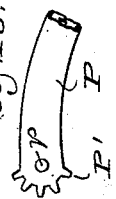
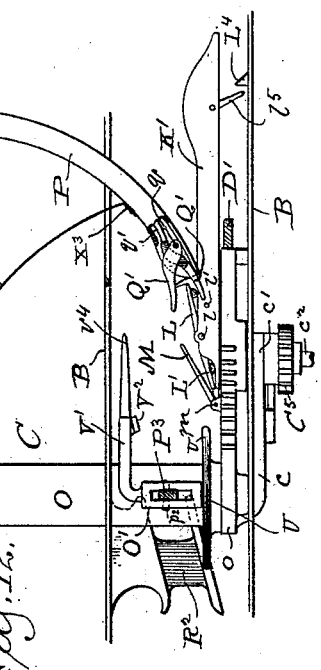
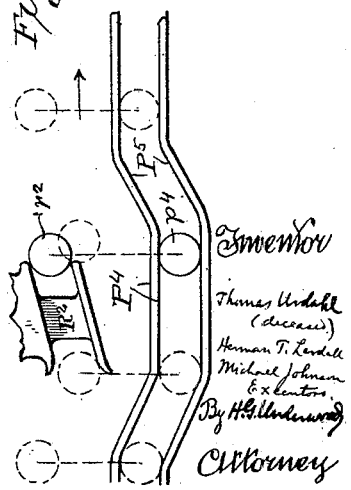

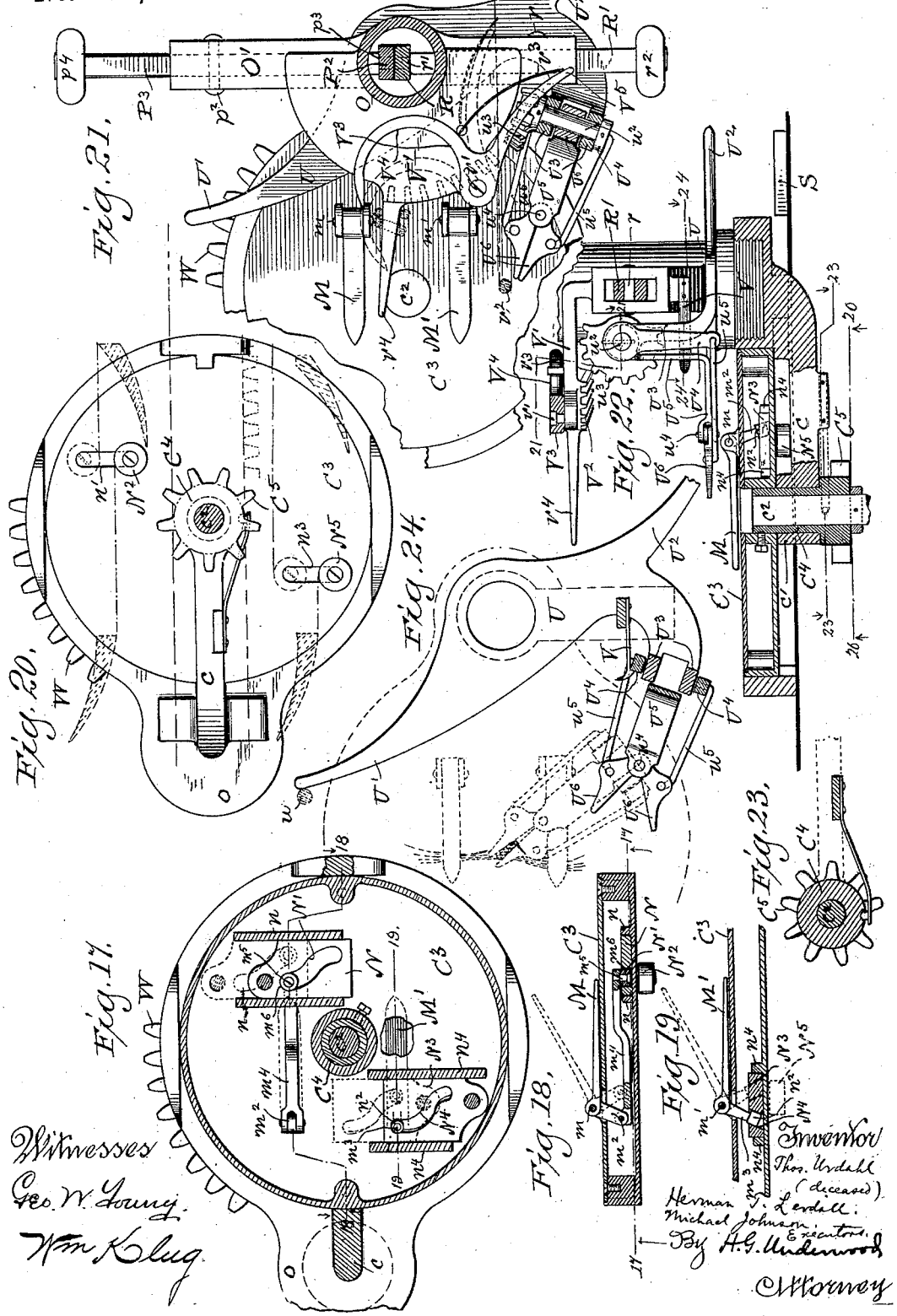

(No Model.) 8 Sheets—Sheet 7.
T. URDAHL, Dec'd.
H. T. LERDALL & M. JOHNSON, Executors.
STRAW BINDER.
No. 467,507. Patented Jan. 26, 1892.
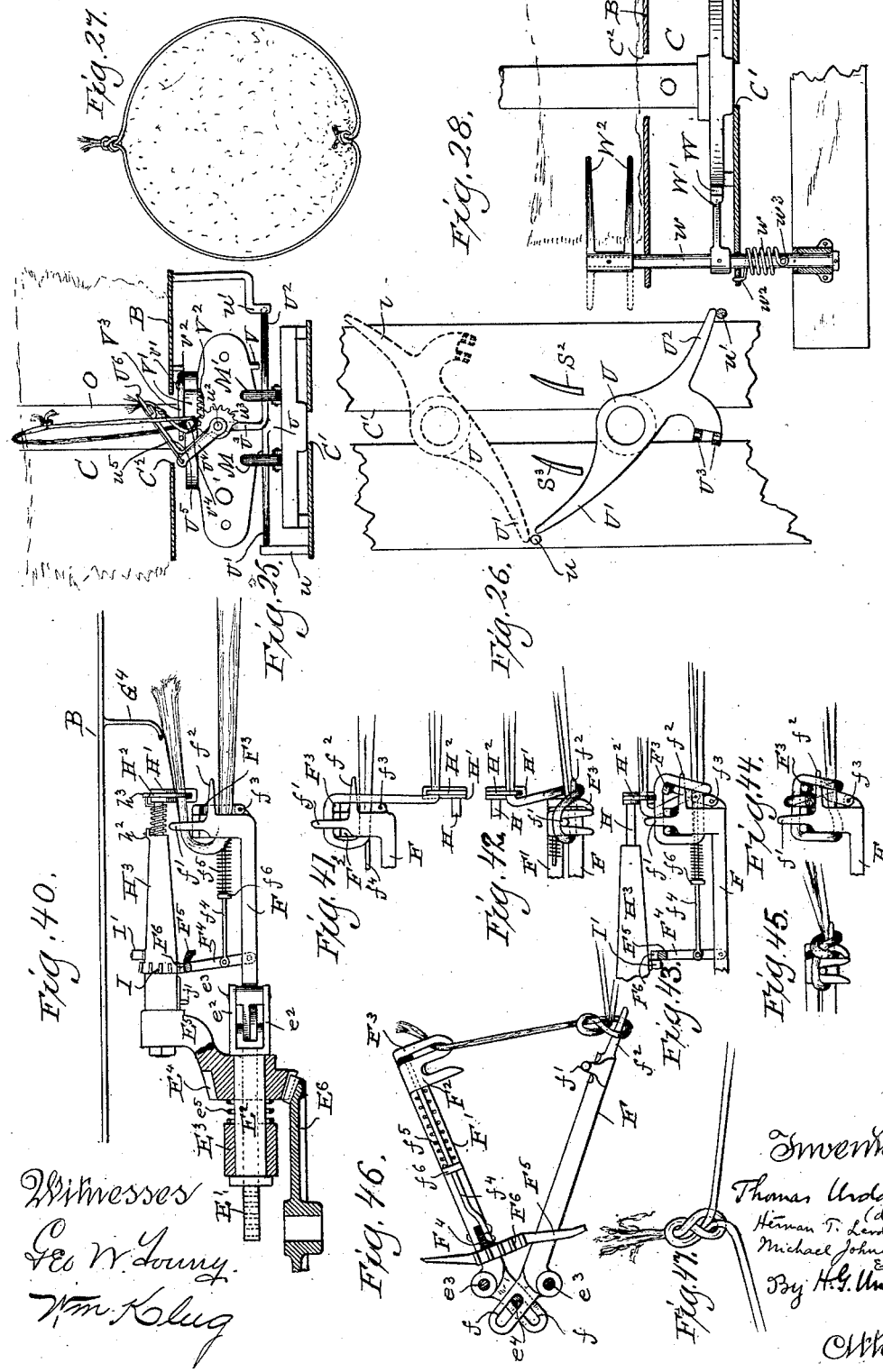

(No Model.) 8 Sheets—Sheet 8.
T. URDAHL, Dec'd.
H. T. LERDALL & M. JOHNSON, Executors.
STRAW BINDER.
No. 467,507. Patented Jan. 26, 1892.
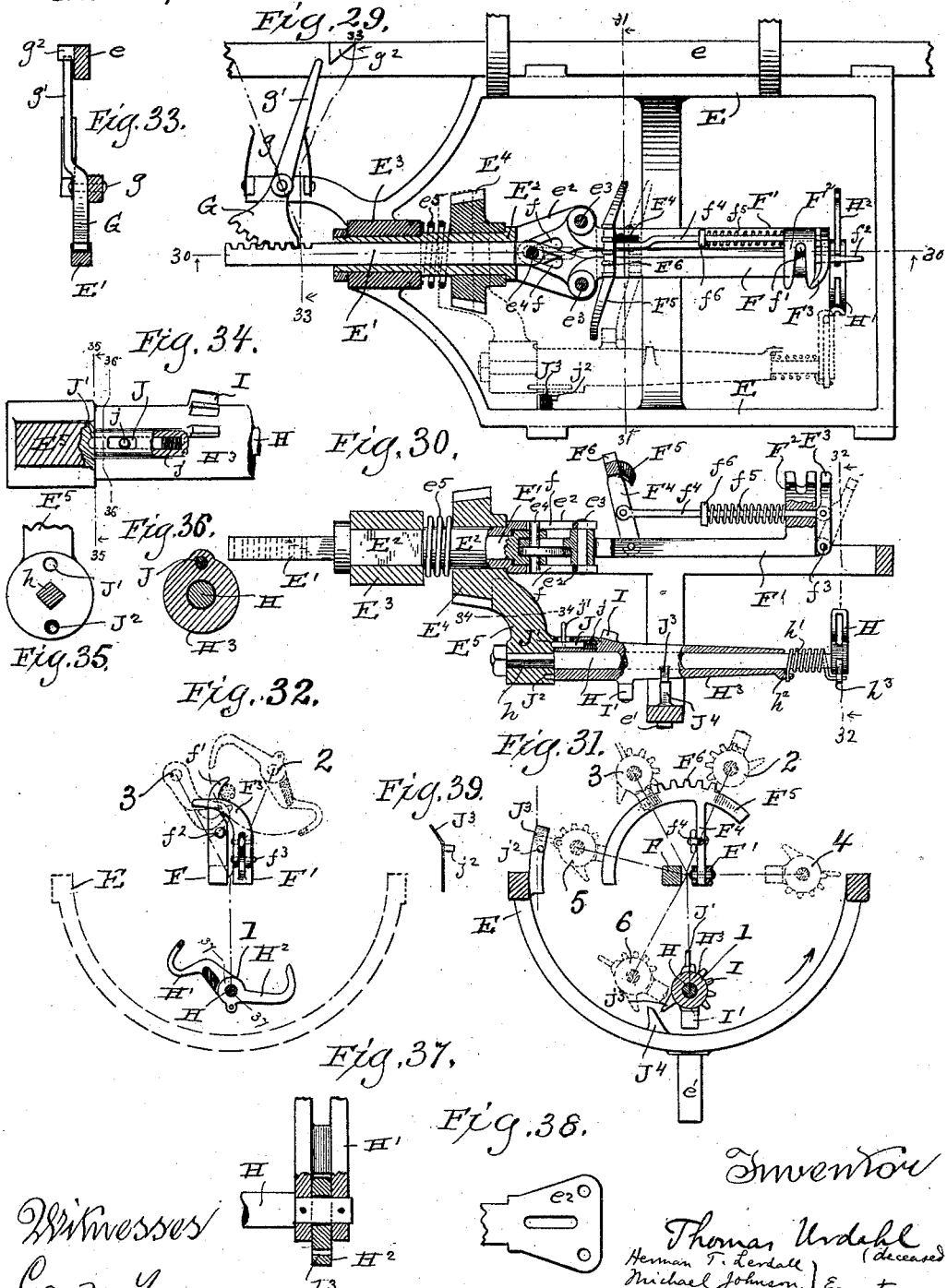
Witnesses
Geo. W. Young
Wm Klug
Inventor
Thomas Urdahl (deceased)
Herman T. Lerdall }
Michael Johnson } Executors
By H. G. Underwood
Attorney

United States Patent Office.

HERMAN T. LERDALL, OF MADISON, AND MICHAEL JOHNSON, OF MOUNT HOREB, WISCONSIN, EXECUTORS OF THOMAS URDAHL, DECEASED.

STRAW-BINDER.

SPECIFICATION forming part of Letters Patent No. 467,507, dated January 26, 1892.

Application filed September 1, 1891. Serial No. 404,464. (No model.)

*To all whom it may concern:*

Be it known that THOMAS URDAHL, deceased, late a citizen of the United States, and a resident of Madison, in the county of Dane, and in the State of Wisconsin, (of whose last will and testament we, HERMAN T. LERDALL, of Madison, in the county of Dane and State of Wisconsin, and MICHAEL JOHNSON, of Mount Horeb, in the county of Dane and State of Wisconsin, respectively, are executors,) did invent certain new and useful Improvements in Straw-Binders; and we do hereby declare that the following is a full, clear, and exact description thereof.

This invention relates to new and useful improvements in grain-binding harvesters; and it consists in the matters hereinafter described, and pointed out in the appended claims.

The object of this invention is to provide in an improved harvester and binder means for forming the band from a portion of the stalks of grain which are cut by the machine and which fall upon the platform of the binder.

Figure 1:
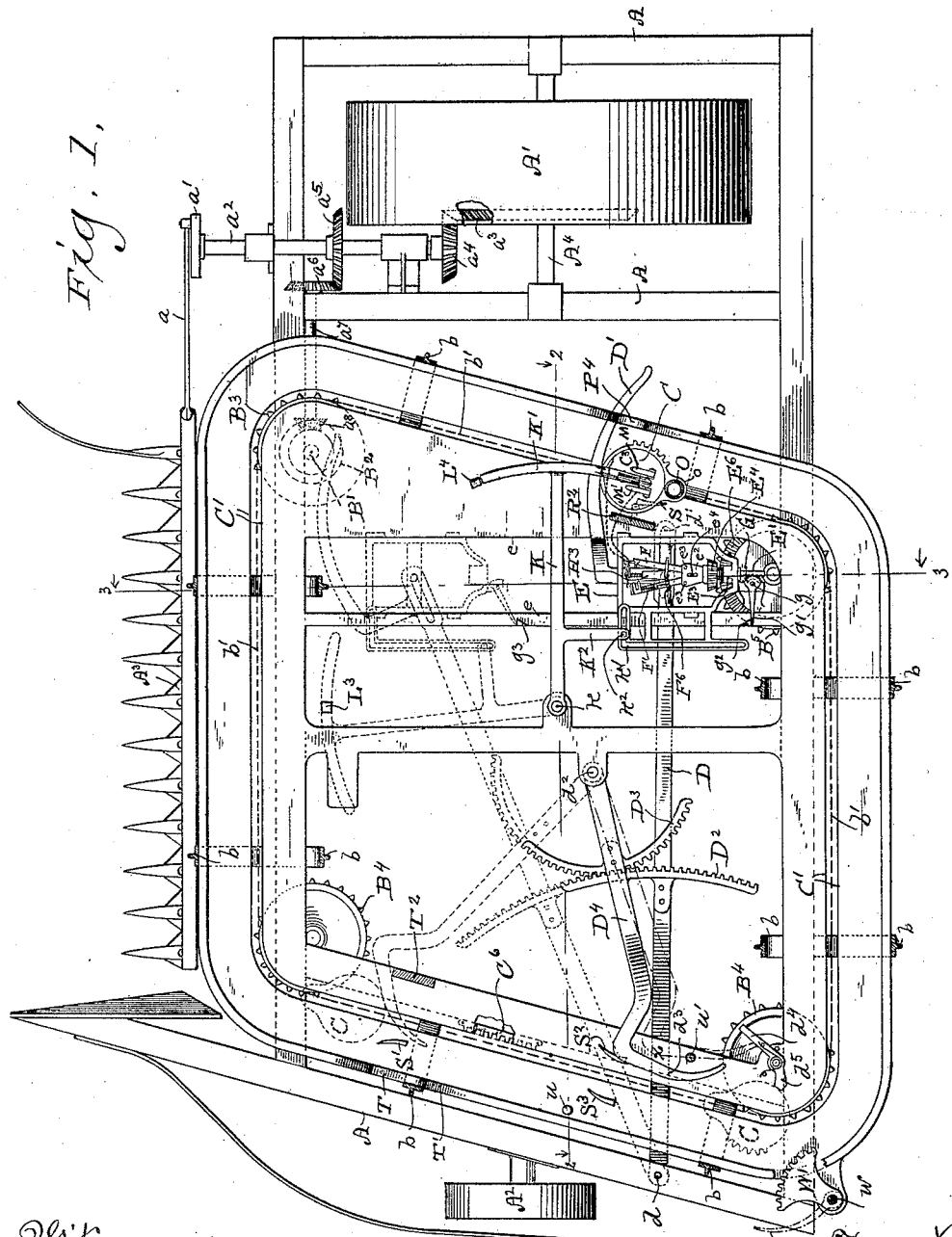
Figure 4:
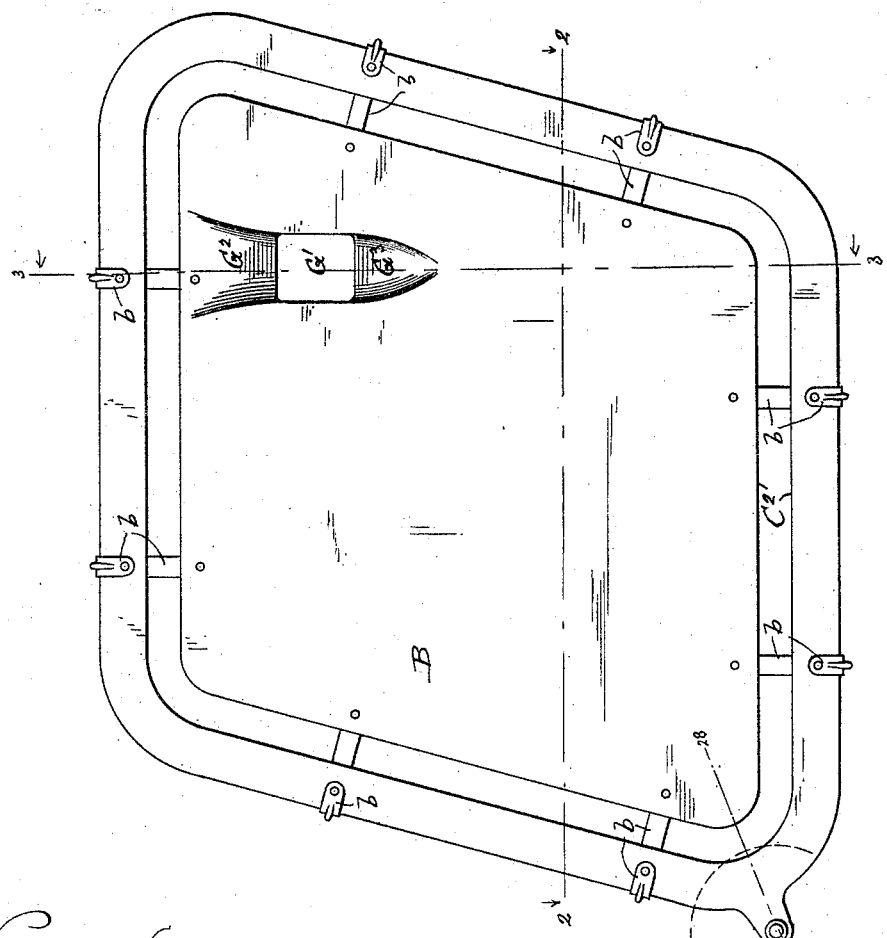

In the accompanying drawings illustrating the said invention, Figure 1 is a top plan view of a harvester and binder constructed in accordance with said invention, with the platform of the machine cut away to show the operating parts below. Fig. 2 is a vertical cross-section of the same on line 2 2 of Fig. 1. Fig. 3 is a longitudinal vertical section on line 3 3 of Fig. 1. Fig. 4 is a top plan view of the platform of the machine. Fig. 5 is a view, partly in section, of the binder mechanism, taken on line 5 5 of Fig. 6. Fig. 6 is a vertical section of the same, taken on line 6 6 of Fig. 5 and illustrating the lower part of the carriage and the track in elevation. Fig. 7 is a vertical section representing in detail the mechanism for twisting the ends of the band. Fig. 8 is a detail view representing a portion of the guides in the machine-frame within which the binder-arm-actuating mechanism travels. Fig. 9 is a detail cross-section on line 9 9 of Fig. 6. Figs. 10 and 11 are detail views of the band-gripping mechanism at the extremity of the binder-arm. Fig. 12 is a side elevation of the band-tying mechanism, showing the gripping-jaws at the extremity of the binder-arm open to receive the end of the band. Fig. 13 is a detail view of the upper end of the binder-arm. Fig. 14 is a detail view of another portion of the guides in the frame of the machine. Fig. 15 is a vertical sectional view of mechanism for dividing the bunch of grain from which the band is formed and holding the ends separate and in position to be grasped by other parts of the mechanism. Fig. 16 is a view, partly in plan and partly in horizontal section, of the parts shown in Fig. 15. Fig. 17 is a horizontal section of mechanism for operating the jaws for holding and twisting the ends of the straw band, said figure being taken on line 17 17 of Fig. 18. Fig. 18 is a vertical section on line 18 18 of Fig. 17. Fig. 19 is a vertical section on line 19 19 of Fig. 17. Fig. 20 is an inverted plan view of the apparatus shown in Figs. 17, 18, and 19. Fig. 21 is a horizontal section on line 21 21 of Fig. 22. Fig. 22 is a view, partly in side elevation and partly in vertical section, of the devices shown in Fig. 21. Fig. 23 is a detail sectional view taken on line 23 23 of Fig. 22. Fig. 24 is a horizontal section on line 24 24 of Fig. 22. Fig. 25 is a side elevation of the device for tucking the twisted ends of the band under the band after the bundle has been formed and the band has been passed around the same and twisted together at its ends. Fig. 26 is a plan view illustrating the two positions of the tucker-actuating lever. Fig. 27 represents the completed band applied to the sheaf or bundle. Fig. 28 is a side elevation of the device for throwing off the completed bundle. Fig. 29 is a vertical sectional view of the mechanism which grasps the bunch of grain from which the band is made and ties the knot in the end of the same. Fig. 30 is a sectional view on line 30 30 of Fig. 29. Fig. 31 is a cross-section on line 31 31 of Fig. 29. Fig. 32 is a cross-section on line 32 32 of Fig. 30. Fig. 33 is a cross-section on line 33 33 of Fig. 29. Fig. 34 is a horizontal section on line 34 34 of Fig. 30. Figs. 35 and 36 are detail cross-sectional views on lines 35 35 and 36 36 of Fig. 34, respectively. Fig. 37 is a detail sectional view on line 37 37 of Fig. 32. Fig. 38 is a detail view of one of the parts shown in Figs. 29 and 30. Fig. 39 is a detail view of one of the parts shown in Fig. 31. Fig. 40 is a side elevation, with parts broken away, of the knotting device shown in Figs. 29 and 30. Figs. 41, 42, 43, 44, and 45 are detail views showing the different changes in the position of the parts of the knotter during the tying of the knot. Fig. 46 shows the knotter after the knot has been tied and with the parts in position to release the band. Fig. 47 shows the completed knot after it leaves the knotting device. Fig. 48 is a detail view of the end of the reciprocating arm which carries the knotting mechanism back and forth beneath the platform of the binder.

In said drawings, A indicates the main frame of the machine, supported in any convenient manner upon a driving-wheel A' and a carrying-wheel $A^2$. The cutter-bar $A^3$ is secured to the forward part of the frame and is operated in any desired manner—as, for instance, by means of a pitman $a$, connected with one end of the cutter-bar and actuated by a rotary head $a'$ upon the forward end of a shaft $a^2$. A bevel-gear $a^3$ upon the main drive-shaft $A^4$ engages a similar gear $a^4$ on the shaft $a^2$ to give a rotary motion to the latter. A bevel-gear $a^5$ is mounted upon the shaft $a^2$ and meshes with a bevel-gear $a^6$ upon a transverse shaft $a^7$ to give motion to the mechanism for forming the band and tying up the bundle.

B indicates the platform, supported upon the main frame by means of standards or brackets $b\ b$. A bevel-gear $a^8$ is located upon the end of the transverse shaft $a^7$ and meshes with a bevel-gear $B^2$ upon the lower end of a vertical shaft B', which shaft is suitably journaled in the main frame and carries upon its upper end a sprocket-wheel $B^3$. The platform B is preferably made of quadrilateral form, the sprocket-wheel $B^3$ being beneath said platform, adjacent to one corner thereof, and sprocket-gears $B^4\ B^4\ B^5$ are journaled upon the main frame, below the platform, adjacent to the other corners of the latter. A sprocket-chain $b'$ is trained over the series of wheels $B^3\ B^4\ B^4\ B^5$ and gives a continuous rotary motion to the gears $B^4$ for the actuation of various parts of the apparatus, as will be hereinafter described.

We will now describe the mechanism for forming the band from a portion of the grain which falls upon the platform after being cut by the knives. A traveling carriage C, the details of which will be hereinafter fully described, is secured to the sprocket-chain $b'$, as shown at $c$, Figs. 5 and 6, and by the continuous movement of said chain is carried around by said chain, moving in a suitable guide or slot C' in the frame-work below the platform, and a slot $C^2$ near the outer edge of the platform. A vibrating lever D, pivotally connected at one end with the frame A, as at $d$, extends transversely beneath the platform and is provided with a projecting arm D', arranged to move in the path of the traveling carriage C and to be engaged thereby. A carriage E, upon which the band tying or knotting mechanism is mounted, is arranged to slide longitudinally in guides or ways $e$ below the platform B, and is operatively engaged with the vibrating end of the lever D by means of a stud or pin $e'$ on said carriage engaging a slot $d'$ in said lever D. It follows from this construction that the vibratory movement of the lever D serves to give a backward and forward movement to said carriage E and the knotting mechanism carried thereby. Now, assuming that the parts of the machine occupy the relative positions shown in Fig. 1 of the drawings, when the machine is started motion will be communicated from the drive-wheel A' through gears $a^3\ a^4$, shaft $a^2$, gears $a^5\ a^6$, shaft $a^7$, and gears $a^8\ B^2$ to the shaft B', which communicates rotary movement to sprocket-gear $B^3$, thus producing a longitudinal movement of the chain $b'$ and rotating the several sprocket-wheels $B^4$ and $B^5$. This longitudinal movement of the chain $b'$ serves, by the engagement of said chain with the traveling carriage C, to move said carriage toward the front of the machine. By its engagement with the projecting arm D' on the lever D the carriage moves the free end of said lever toward the front of the machine, thus carrying the reciprocating carriage E forward from the position shown in full lines in Figs. 1 and 2 to the position shown in dotted lines in said figures.

The knotting mechanism carried by the reciprocating carriage E comprises a longitudinally-movable non-rotative shaft E', mounted in a non-rotative sleeve $E^2$, which is secured rigidly in a suitable support $E^3$ upon the rear end of the carriage E. An extension $e^2$ is provided upon the forward end of the sleeve $E^2$, to which two expansible jaws or arms F and F' are pivotally secured at $e^3\ e^3$. The rear ends of the jaws F and F' are prolonged somewhat beyond the pivotal connections $e^3\ e^3$ of said jaws with the projection $e^2$ on the sleeve $E^2$ and are provided with slots $f\ f$, made oblique to the axis of the shaft E'. A stud or pin $e^4$ is provided upon the outer or forward end of the shaft E', which pin engages with the oblique slots $f\ f$ in the jaws F F'. The rear end of said non-rotative shaft E' is provided with rack-teeth, as shown more particularly in Fig. 29, and a segmental gear G is mounted upon a stud $g$ on the frame E and engages with the rack-teeth on the rear end of the shaft E'. The segmental gear G is provided with a laterally-extended arm $g'$, as shown more particularly in Fig. 29, by which the segmental gear may be rotated to give a longitudinal movement to the shaft E'.

A lug $g^2$ is provided upon the machine-frame and is located in the path of the extended arm $g'$, and said arm $g'$ is engaged by the lug $g^2$ by the longitudinal movement of the carriage E, so as to rotate said arm and said segmental gear G and to move the shaft E' forward within the sleeve $E^2$. The longitudinal forward movement of the shaft E' will, by the engagement of the pin $e^4$ with the slotted ends of the jaws F F', cause said jaws to open, as shown in Fig. 1. The jaws F F' remain open during the forward movement of the carriage E, and as the said carriage reaches the limit of its forward movement the arm $g'$ on the segment G rides over a second lug or cam projection $g^3$ upon the frame, by which lug said arm $g'$ is engaged upon the commencement of the backward movement of said carriage E to give a rotary motion to the segment G in the opposite direction, so as to retract the shaft $E'$ and close the jaws F F' upon the bunch of grain from which the band is to be formed.

As shown in Figs. 1 and 4, the sides of the frame and the platform are preferably made oblique and the guides for the reciprocating carriage E are preferably made at right angles to the cutter-bar, so that as the traveling carriage C moves forward and approaches the forward margin of the platform said carriage will have been crowded laterally by the oblique guides C' out of engagement with the arm D' on the lever D, by which the carriage E is moved, so that the carriage C will be free to continue its movement around the periphery of the platform, as will be more fully described hereinafter.

A segmental rack $D^2$ is provided upon the lever D, and, as shown in Fig. 1, is engaged with a second segmental rack $D^3$ upon a lever $D^4$, pivoted to the frame at $d^2$. By this construction it is obvious that the movement of the free end of the lever D toward the front of the machine will, through the medium of the segmental racks $D^2$ and $D^3$, produce an oscillating movement of the arm $D^4$ about its pivotal connection $d^2$ and cause its free end to move forward toward the front edge of the platform. After this movement of the levers D and $D^4$ and of the carriage E toward the forward portion of the machine and the disengagement of the traveling carriage C from the arm D' of said lever D the levers D and $D^4$, together with the carriage E, remain in the positions shown in Fig. 1 in dotted lines, while the carriage C is carried by the endless chain $b'$ across the front of the machine and some distance toward the rear along the inclined guide C' upon the left-hand side of the machine. A curved projecting end $d^3$ is formed upon the lever $D^4$, said projecting end being arranged to move into the path of the carriage C by the forward motion of the said lever. When the carriage C reaches the position shown in dotted lines, Fig. 1, at the beginning of its rearward movement, it comes into engagement with the free end $d^3$ of the lever $D^4$, and by its rearward movement carries the end $d^3$ of said lever rearwardly. This rearward movement of the lever $D^4$ obviously serves to again move the lever D toward the rear, and thus to retract the carriage E. As soon as the carriage E begins to move toward the rear the arm $g'$ is engaged by the lug or cam $g^3$ and is oscillated by its engagement with said lug to retract the shaft $E'$ and close the jaws F F' upon the bunch of grain which is to form the band.

In order to facilitate the operation of the jaws F F' in the work of grasping the straw and withdrawing the same beneath the platform, said platform is provided with an opening G' near its forward margin, beneath which opening the gripping-jaws rest when the carriage E is at the limit of its forward movement. The platform is at this point further provided with depressions $G^2$ $G^3$ at the front and rear, respectively, of said opening G'. As shown in Fig. 3, the stalks of grain falling upon this portion of the platform will be unsupported above the gripping-jaws, and will therefore sag downwardly and come within reach of the said jaws. As the carriage C continues to move rearwardly the lever $D^4$ is forced backward by its engagement with said carriage, thus retracting the carriage E. This movement is continued until the lever $D^4$ is moved into the position shown in dotted lines at the rear part of said Fig. 1, at which time the carriage C becomes disengaged from said lever and continues its movement toward the rear of the machine. The lever $D^4$ remains in its extreme rearward position while the carriage moves from the point $x$, Fig. 1, toward the rear and into the position shown by dotted lines C at the rear of Fig. 1, the extreme end of said lever being, while said lever is in this position, in engagement with a small bell-crank lever $d^4$. When the carriage C reaches the position shown in dotted lines at C, Fig. 1, it engages one arm $d^5$ of said bell-crank and rotates said lever, so as to force the end of the lever $D^4$ slightly forward and into the position shown in full lines in Fig. 1. It will be observed that when the levers D and $D^4$ are in the positions shown in full lines the carriage E is also in the position shown in full lines, Fig. 1. A bevel-pinion $E^4$ is loosely mounted upon the sleeve $E^2$, as shown in Figs. 29 and 30, and is arranged to engage with a bevel-gear $E^6$, located upon the upper side of the sprocket-wheel $B^5$ and preferably formed integral therewith, as shown in Fig. 3, when the carriage is at the extreme rearward limit of its movement. A radial arm $E^5$ is carried by the pinion $E^4$, as shown in Figs. 29, 30, and 40, said arm being pierced at its outer end for the passage of the squared end $h$ of a spindle H. A curved or hook-shaped jaw H' is rigidly secured to the outer end of the spindle H, and a second jaw $H^2$ is pivotally secured to said spindle adjacent to the jaw H', as shown in Figs. 29, 30, and 32. A sleeve $H^3$ is located upon the outside of the shaft or spindle H and terminates near the outer or forward end of said shaft and near the jaws H' and $H^2$, mounted thereon. A spiral spring $h'$ is located upon the forward end of said spindle, between the outer end of the sleeve $H^3$ and said jaws, said spring being conveniently secured, as at $h^2$, at one end to the end of said sleeve and at the other end, as at $h^3$, to the pivoted jaw $H^2$. Upon the outside of the sleeve $H^3$ is provided a segmental gear I, by which said sleeve may be partially rotated about the shaft or spindle H. By such rotation of said sleeve motion is communicated to the pivoted jaw H² through the medium of the spring h' to open said jaw into the position shown in Fig. 32.

The gripping-jaws F and F' are constructed as follows: The jaw F is provided with an upturned extremity having an upwardly-projecting finger f' and a horizontally-projecting finger f², as shown more particularly in Fig. 40 of the drawings. The jaw F' comprises two parts, one part F² being a rigid projection upon the upper side of the jaw F' and the other part F³ being a finger pivotally secured thereto, as at f³ in Fig. 40. A rod f⁴ connects the pivoted finger F³ with an arm F⁴, pivoted upon the jaw F' adjacent to its pivotal connection e³ with the extension on the non-rotative sleeve E², said rod being provided with a spring f⁵, as shown in the drawings. At the outer end of this arm F⁴ is provided a segmental cam F⁵, having rack-teeth F⁶ upon a portion of its outer periphery, as shown in Figs. 29, 30, and 31 more particularly.

It will be observed by reference to Fig. 1 of the drawings that while the traveling carriage C is moving from the point x, where it passes out of engagement with the curved end d³ of the arm D⁴ until it has engaged with the arm d⁵ of the bell-crank at the rear left-hand corner of the platform of the machine, the levers D and D⁴ will occupy their extreme rearward positions and the bevel-pinion E⁴ will be held in engagement with the bevel-gear E⁶, which is kept constantly revolving by the endless chain b'. It follows, therefore, that during this portion of the travel of the carriage C the pinion E⁴ will be revolved, and as soon as the carriage C has engaged the arm d⁵ of the said bell-crank and rotated said bell-crank to again throw the levers D and D⁴ into the positions shown in full lines, Fig. 1, the carriage E will have been moved slightly forward into the position shown in Fig. 1, so as to carry the pinion E⁴ out of engagement with the bevel-gear E⁶. The relative sizes of the pinion E⁴ and the gear-wheel E⁶ are such that during this movement of the carriage C and chain b' the said pinion E⁴ will have been given two complete revolutions. During these two revolutions of the said pinion the knot is tied in the end of the bunch of grain in the following manner: When the carriage E is retracted beneath the platform of the machine, the bunch of straw is held by the gripping-jaws, as shown in Fig. 40, and as said carriage is retracted a downward projection G⁴ upon the under side of the platform engages the end of the bunch and folds said end forwardly, as shown in said Fig. 40. During this rearward movement of the carriage E the arm E⁵ and the spindle H, with the jaws H' and H², remain in the position shown in Fig. 2 below the jaws F F', the jaws H' H² being opened, as shown in Fig. 32 in full lines. In this position, also, the sleeve H³ occupies the position shown in section in Fig. 31 by full lines. Now, by the rotation of the pinion E⁴ the radial arm and the parts carried thereby are rotated in the direction shown in Fig. 31 by the arrow. The operations of the jaws H' H² during this rotation of said pinion are more particularly shown in Figs. 31 and 32. In said figures the various positions of the parts are numbered from 1 to 6, respectively. At the beginning of the movement of said parts the sleeve H³ occupies the position indicated at 1 in Fig. 31 and the jaws H' H² the position shown at 1 in Fig. 32. Now, by the rotation of the arm in the direction indicated by the arrow the sleeve H³ is carried around into the position shown at 2 in dotted lines, Fig. 31, while said jaws move into the corresponding position shown at 2, Fig. 32. When the sleeve H³ reaches this second position, the teeth I upon its side engage with the rack-teeth F⁶ upon the segmental cam F⁵, and by the continued movement of the arm and the spindle said sleeve is, by its engagement with said rack-teeth, rotated into the position shown by dotted lines, Fig. 31, at 3, thus transmitting motion to the jaw H² and causing said jaw to close against the jaw H', when said jaws will occupy the position shown by the dotted lines at 3 in Fig. 32. This closing movement of the jaws H' H² is effected at a point during the revolution of the pinion E⁴ when said jaws are in a position to grasp the end of the bunch of grain, as shown more particularly in Fig. 40. By the continued movement of said parts the said jaws H' H² are carried around the jaws F F', so as to carry the end of the bunch of straw downwardly around said jaws F F', which latter jaws remain closed during this movement of said jaws H' H². The movement of the pinion E⁴ is continued, moving the sleeve H³ into the position shown in Fig. 31 in dotted lines at 4, the jaws H' H² meanwhile remaining closed, so as to carry the end of the bunch of straw into the position shown in Fig. 42. By the partial rotation of said sleeve about said spindle a roller I' upon said sleeve is brought into the position shown in Fig. 31 at 3 and 4 by the dotted lines, so that by the second revolution of the pinion the said roller I' will be brought into engagement with the segmental cam F⁵, passing to the rear of said cam, and, by its engagement therewith, forcing the arm which supports it forward, so as to open the pivoted finger F³ of the composite jaw F', as shown in dotted lines, Fig. 30, and in full lines, Fig. 43, so that as the arm E⁵ continues to move about the jaws F F' the straw will be carried by the jaws H' H² between the stationary part F² of the jaw F' and the pivoted finger F³. By the time the arm moves sufficiently downward about said jaws to free the roller I' from said segmental cam F⁵ the straw will be drawn down between said pivoted finger and the stationary part of said jaw F², as shown in Fig. 44, so that as the roller I' is freed from its engagement with said cam the spring $f^5$ will, by its engagement with a projection $f^6$ on the rod $f^4$ and with the stationary part $F^2$ of the jaw, cause the pivoted finger $F^3$ to close upon the straw between it and said stationary part of the jaw. In this condition the jaws F F' hold the knot thus formed, as shown in Fig. 45. A spiral spring $e^5$ is preferably located upon the non-rotative sleeve $E^2$, between the bearing $E^3$ and the bevel-pinion $E^4$, so that as the said pinion makes its second revolution and the pivoted finger $F^3$ is opened to its fullest extent by the engagement of the roller I' upon the sleeve $H^3$ with the segmental cam $F^5$ the continued pressure of said segmental cam upon said roller will operate to move the said sleeve, together with the spindle and the pinion which carries the same, slightly to the rear, as indicated in Fig. 29 by dotted lines.

As shown in Figs. 30, 34, 35, and 36, the sleeve $H^3$ is bored out at its rear end to admit a spring pin or catch J, which is pressed outwardly by a spring $j$ in the inner end of the said bore. The pin J is provided with a projection $j'$, which extends outwardly through a slot in said sleeve, as shown in Figs. 30 and 34. The surface of the arm $E^5$, against which said sleeve bears, is provided with a slight depression J', arranged to engage the spring-pin J when the sleeve is revolved, so as to bring said pin opposite said depression. A deeper depression or notch $J^2$ is provided near the other margin of said surface, into which said spring-pin drops when the sleeve has made a half-revolution about the spindle, so as to firmly retain the sleeve and the spindle in the same relative positions during the rotation of the gear-wheel $E^4$ and arm $E^5$ about the jaws F F', as before described. By this means when the jaws H' $H^2$ are brought to the position indicated in Figs. 31 and 32 by dotted lines at 3 the spring-pin in the sleeve is brought into position for engagement with the notch $J^2$ at the time when the said jaws close upon the ends of the straw.

An inclined projection $J^3$ is provided upon the frame of the carriage E, as shown more particularly in Figs. 31 and 39, and as the pinion $E^4$ performs its second revolution and the finger $F^3$ closes upon the end of the bunch of straw which is drawn by the jaws H' $H^2$ between said finger and the stationary portion of the jaw the sleeve $H^3$, arm $E^5$, and pinion $E^4$ being crowded slightly toward the rear, as before described, the projection $j'$ on the spring-pin J is brought into engagement with the inclined projection $J^3$ on the carriage-frame, so as to force the pin J out of engagement with the recess or notch $J^2$ and permit the sleeve to rotate upon the spindle H. A stud $j^2$ is provided upon said inclined projection, and as soon as the spring-pin J is freed from its engagement with said recess $J^2$ the projecting arm $j'$ comes into engagement with said stud, as shown in dotted lines, Fig. 31, at 5. By the engagement of said arm with said stud the sleeve is partially rotated upon the spindle, so as to move the spring-pin J away from said recess $J^2$ and to bring the parts into the relative positions shown in Fig. 31 by dotted lines at 6, the jaws H H' being partially opened by said movement of the sleeve.

A stop $J^4$ is provided on the frame of the carriage E, said stop being arranged in the path of a projecting lug $j^3$ on the sleeve $H^3$, so that as the said sleeve is carried around in the relative position shown in dotted lines, Fig. 31, at 6, said projecting lug $j^3$ will engage the projection $J^4$, thus operating to produce a further rotation of the sleeve upon the spindle and bringing the parts back to the first position. By the movement of the sleeve last described the jaw $H^2$ is moved into the position shown in Fig. 32 in full lines and the spring-pin J is brought into engagement with the shallow recess or depression J' on the arm $E^5$. The engagement of said spring-pin with said shallow depression serves to hold the sleeve in the same position relatively to the spindle, the jaws H' $H^2$ being thereby held open until the teeth I are again brought into engagement with the rack-teeth $F^6$ by a subsequent rotation of the pinion $E^4$ and the moving parts carried thereby. Now, by the engagement of the carriage C with the arm $d^5$ of the bell-crank and the consequent movement of the latter by the continued movement of the said carriage, the arm $d^4$ of said bell-crank is moved so as to crowd the lever $D^4$ slightly forward into the position shown in full lines, Fig. 1, so as to move the lever D and the carriage E, so as to carry the pinion $E^4$ out of engagement with the gear-wheel $E^6$. By this forward movement of the carriage E the arm $g'$ is brought into engagement with the cam or projection $g^2$ on the machine-frame and the segmental gear G is partially rotated, so as to partially spread the jaws F and F' apart, as shown in Figs. 1 and 46 of the drawings. Now by this movement of said jaws the end of the bunch of straw which is held between the finger $F^3$ and the stationary part $F^2$ of the jaw F' is carried away from the jaw F, and the horizontal finger $f^2$ being still engaged with the loop formed in said band by the carrying of said end around the jaws F F' the knot formed by the operation previously described is pulled off from the stationary part $F^2$ of the jaw F' and is held by the horizontal finger $f^2$ of the jaw F, as shown in Fig. 46.

A lever K, carrying a cross-arm K', is pivotally secured at $k$ to the frame of the machine, and a slotted bracket $k'$ is provided upon the side and end of the carriage E. As shown more particularly in Fig. 1, this lever is provided with a lateral arm $K^2$, which engages the slot in the bracket $k'$, as shown at $k^2$. By this construction the back-and-forth movement of said carriage E produces a vibrating movement of the lever K from the position shown in dotted lines, Fig. 1, to that shown in full lines, or vice versa. As also shown in said figure, the slot in the extension or bracket $k'$ is made sufficiently long to permit of a considerable degree of movement of said carriage without producing any motion of the lever K. The cross-arm K' is arranged to move in substantially the same horizontal plane with the gripping-jaws F F', so that as said lever K begins to move, the carriage E having already moved some distance toward the rear, the forward end of the cross-arm K' will pass just below the butt-end of the bunch of straw which is being carried rearwardly by said carriage to form the band. The cross-arm K' is provided upon its forward end with jaws L L', pivoted to arm K' at $l$ and $l'$, respectively, as shown in Figs. 15 and 16. A stud $l^2$ upon one of said jaws engages a slot $l^3$ in the other of said jaws, as shown in Fig. 15, and a connecting-rod $L^2$ is connected at one end with said stud $l^2$ and is pivotally connected at its other end, as at $l^4$, with a rock-arm $l^5$, which is pivoted to the arm K', as shown in Fig. 15. A lug $L^3$ is provided upon the frame, said lug being located in the path of the rock-arm $l^5$, and, as shown in Fig. 1, being located in such a position as to operate said arm about the time when the forward end of the arm K' passes below the end of the bunch of grain. When the connecting-rod $L^2$ is retracted or in the position shown in dotted lines, Fig. 15, the jaws L L' will also occupy the position shown in dotted lines, being closed together and slightly elevated above the end of the arm K'. In this position as the forward end of the cross-arm K' passes below the butt-ends of the straw said jaws will divide the bunch of straw, so that when the rock-arm $l^5$ engages the stud $L^3$, so as to move into the position shown in full lines, Fig. 15, the connecting-rod $L^2$ will, by its engagement with the stud $l^2$, rotate the jaw L about its pivotal connection $l$ in the direction shown by the arrow, thus carrying one part of the straw around between said jaw and the upper surface of the arm K'. By the engagement of the stud $l^2$ with the slot $l^3$ in the jaw L' the jaw L' is simultaneously crowded down upon the other portion of the straw, so as to hold the same firmly between the extreme forward end of the cross-arm K' and said jaw L'. In this condition the jaws L L' hold the divided ends of the bunch of straw in the manner shown in Fig. 16. When the reciprocating carriage E moves into the position shown in Fig. 1 in full lines, the lever K, with the cross-arm K', will be moved into the position shown in Fig. 1 by full lines, and the butt-ends of the bunch of grain will be held by the jaws carried by said arm K' in the path of the carriage C, said ends being held somewhat apart, as shown in Fig. 16. After the carriage C moves out of engagement with the arm $d^5$ of the bell-crank lever at the rear left-hand corner of the machine-frame said carriage is drawn by the chain $b'$ across the rear end of the frame and then forward along the oblique guide C' at the right-hand side of the machine.

We will now proceed to describe the construction of the carriage C and the mechanism supported thereby. The carriage C is made of substantially circular form, as shown in Figs. 17, 20, and 21, and provided with a central annular opening, within which is secured a revoluble circular center-piece $C^3$, provided with a central hub $C^4$, which hub is journaled within a hub $c'$ upon the extremity of an arm $c$, which extends downwardly and inwardly from the circular carriage C, as shown in Figs. 20 and 22. Within this hub $C^4$ is journaled a stud $c^2$, to which the chain $b'$ is attached below the lower end of the hub $C^4$. A pinion $C^5$ is secured to the lower end of the hub $C^4$, as shown in Figs. 5, 6, 7, 20, and 22, by the rotation of which pinion the revoluble center $C^3$ of the carriage is turned. Jaws M and M' are provided upon the upper surface of the revoluble center $C^3$, said jaws being pivoted thereto at $m$ and $m'$, respectively. Arms $m^2$ and $m^3$ project downwardly from said jaws M and M', respectively, said arms being passed through suitable slots or apertures in the upper surface of the revoluble center $C^3$. A link $m^4$ is connected at one end with the arm $m^2$ on the jaw M, and at the other end is provided a stud $m^5$, upon which is journaled an anti-friction roller $m^6$. A sliding plate N is provided upon the lower wall of the center-piece $C^3$, as shown in Figs. 17 and 18 more particularly, said plate having a longitudinal movement between guides $n$ $n$ and provided with a cam-slot N', within which the roller $m^6$ moves.

Upon the lower side of the sliding plate N is provided a roller $N^2$, which is mounted upon a stud extending downwardly from said plate N through a slot $n'$ in the lower wall of the center-piece $C^3$ and arranged to engage with suitable cams upon the machine-frame to give a longitudinal movement to the sliding plate N, as will be hereinafter fully described. By the longitudinal movement of said sliding plate the roller $m^6$, which engages the cam-slot in said plate, will be crowded to the right or left, according to the direction in which the said sliding plate moves, and will, through the medium of the link $m^4$, rock the arm $m^2$ about the pivotal connection $m$ with the center-piece $C^3$, thereby operating to raise or lower the jaw M in an obvious manner. A similar plate $N^3$ is located below the pivotal connection $m'$ of the jaw M' with the center-piece $C^3$, said plate $N^3$ being provided with a cam-slot $N^4$, which engages a roller $n^2$ on the lower end of the arm $m^3$ of the jaw M'. The plate $N^3$ is provided with a roller $N^5$, located upon a stud which passes through a slot $n^3$ in the lower wall of the revoluble center $C^3$, said plate being also supported between guides $n^4$ $n^4$, so as to be capable of a longitudinal movement between said guides. The longitudinal movement of the plate $N^3$ serves to give an upward or downward movement to the jaw M', the roller N⁵ being arranged to engage suitable cams upon the frame of the machine, as before described with reference to the roller N², for this purpose. A hollow standard O is located upon a lateral projection o upon the margin of the carriage C, said standard extending upwardly through the slot in the platform of the machine, as shown in Figs. 5 and 6.

The binder-arm P, preferably of hollow form, is pivotally supported at p upon the upper end of the standard O, the end of said binder-arm being provided with gear-teeth P', arranged to engage the teeth p' of a vertically-movable rack P², which, as shown more particularly in Figs. 12 and 21, passes through guides o' o' upon the interior of the hollow standard O. By an upward or downward movement of this rack the binder-arm will be caused to rotate about its pivotal connection p with said standard, so as to lower or raise the free end of said binder-arm. In order to produce such vertical movement of the binder-arm, a lever P³ is provided, said lever being pivoted at p² to a bracket O' at the lower end of the standard O and being engaged with an aperture p³ in the lower end of the rack-bar P², as in Fig. 12. Upon the outer or free end of said lever P³ is provided a roller p⁴, adapted for engagement with inclined or cam surfaces P⁴ upon the machine-frame to give an upward or downward movement to the said outer end of said lever. Jaws Q Q' are provided upon the free end of the binder-arm P, one of said jaws being pivoted within the extremity of said binder-arm, as at q, and the other jaw having a movable engagement with said pivoted jaw and being longitudinally movable within the hollow binder-arm. A rod q' is rigidly connected with said longitudinally-movable jaw Q and extends through the interior of the hollow arm P. A spring q² is located about said rod and bears against a shoulder on said rod and a projection on the inside of the hollow arm, so as to normally press said jaw outward. A link Q² is connected at q³ with the upper end of said rod and at q⁴ with an arm on a pinion Q³, also journaled upon the pin p. A second rack R is located within the standard O beside the rack-bar P², but being independent of said rack-bar P², while moving vertically within the same guides. The rack-bar R is engaged by the pinion Q³, so that a vertical movement of said rack will rotate said pinion and move the link Q², so as to give a longitudinal movement to the rod q', thereby opening and closing the jaws Q Q' in an obvious manner. The vertical movement of the rack-bar R is produced by means of a lever R', pivoted at r to a lateral projection upon the base of the standard O and engaging the slotted lower end r' of said rack-bar R. The outer end of said lever R' is provided with a roller r², arranged to engage with cam-surfaces R² upon the machine-frame to give a vertical movement to the free outer end of said lever.

The operation of the above-described mechanism is as follows: Supposing that the jaws M M' on the carriage C are both raised as said carriage approaches the position shown in full lines, Fig. 1, and that the binder-arm is elevated, as in dotted lines, Fig. 6, and supposing, also, that the band has been formed by the tying mechanism before described, and that the lever K, with arm K', is moved into the position shown in Fig. 1, the jaws L L' thereon grasping the divided ends of the bunch of straw, as hereinbefore described, the carriage C is drawn forward in the track or guide C' by the chain b', as before described, until by the time the carriage C comes into engagement with the lever D' to move the carriage E the jaw M upon the carriage C will come against the end of the straw band, which is held by the jaw L upon the arm K'. At this instant the roller N² beneath the revoluble center C³ of said carriage comes into engagement with a cam projection S upon the machine-frame, thus operating to close said jaw M upon the end of the straw band. Simultaneously with this movement of the jaw M the rollers p⁴ and r² upon the extremities of the pivoted levers P³ and R' come into engagement with the inclined surfaces P⁴ and R², respectively, the engagement of the roller p⁴ with the former operating to raise the rack-bar P² and to lower the outer or free end of the binder-arm in the manner before described. This downward movement of the binder-arm brings its extremity into the position shown in Fig. 12. Simultaneously with the movement of the binder-arm the rack-bar R is depressed by the engagement of the roller r² with the cam-surface R², thereby operating to retract the rod q' within the binder-arm P and opening the jaws Q Q' in the manner before described, so that as the outer end of the binder-arm reaches the position shown in Fig. 12 the said jaws will inclose the end of the band held by the jaw L on the cross-arm K'. By this time the carriage comes into engagement with said cross-arm K', causing said arm to begin to move toward the forward end of the machine, so that the lever l⁵ is brought into engagement with the projecting lug L⁴ on the frame of the machine, so as to raise the jaws L L' and free the ends of the band, which are now held by the jaw M and the gripping-jaws Q Q' on the end of the binder-arm, the roller r² having meanwhile become disengaged from the inclined guide, so as to permit the spring q² to close the jaws Q Q' upon the end of the band. By the time the jaws L and L' release the ends of the band the carriage has moved sufficiently forward to bring the roller p⁴ into engagement with a second inclined surface P⁵, which produces a downward movement of the rack-bar P² and a consequent raising of the binder-arm in the manner before described. The band is now held at one end by the jaw M on the carriage below the level of the platform, while the other end of said band is held by the jaws on the extremity of the uplifted binder-arm, as shown in dotted lines, Fig. 6. In this condition the carriage travels forwardly and across the forward end of the front of the machine, and the grain which has fallen upon the platform, after being cut by the knives $A^3$, is gathered up and carried across the front of the machine by the band, which is held by the jaw M and the jaws Q Q'. After the carriage has traveled across the front of the machine and begins its rearward movement upon the left-hand side of the machine the rollers $p^4$ and $r^2$ come into engagement with inclined guides T and $T^2$, respectively, the roller $p^4$ operating, as before, to move the outer end of the binder-arm downward, so as to carry the end of the band held by the jaws Q Q' downward upon the opposite side of the bundle from the end which is held by the jaw M. By this movement of the binder-arm the end of the band carried thereby is carried beneath the upraised jaw M', and at the instant when said arm reaches its lowest position, as shown in Fig. 6 by full lines, said jaw M' is caused to descend upon the end of said band by the engagement of the roller $N^5$ with a cam projection S' upon the frame of the machine, the jaw M' being thereby caused to grip said end of the straw band. As soon as the jaw M' has gripped the end of the band the roller $r^2$ comes into engagement with the cam-surface $T^2$ on the machine-frame, thus again operating the lever R' to elevate the rack-bar R, so as to open the jaws Q Q' on the end of the binder-arm, in the manner before described, when by the continued movement of the carriage C the roller $p^4$ comes into engagement with a second cam-surface T', which moves the roller in the opposite direction, thus elevating the binder-arm into its first position, the ends of the band being now both held by the jaws M M' on the revoluble center $C^2$ of the carriage C. The continued rearward movement of the carriage now brings the pinion $C^5$ and the lower end of the hub $C^4$ on the revoluble center $C^3$ of said carriage into engagement with a stationary rack-bar $C^6$ on the machine-frame, so as to cause said revoluble center to rotate and thus twist together the ends of the band, which are held by the jaws M M'. The band now assumes the appearance shown in Fig. 7. It now becomes necessary to secure the twisted ends of the straw band, and we accomplish this by the mechanism which we will now proceed to describe. A device arranged to grasp the twisted ends of the band and tuck the same beneath the band is employed for this purpose, said device being constructed as follows: A rock-arm U is loosely mounted upon the standard O, so as to be permitted to partially rotate about the same, and is provided upon ends with projecting arms U' $U^2$, arranged to come alternately into engagement with studs $u$ $u'$ on the machine-frame. This rock-arm U is provided with upwardly-projecting standards $U^3$ $U^3$, at the upper ends of which is journaled a shaft $u^2$.
Upon one end of the shaft $u^2$ is located a segmental gear $u^3$, and upon the said shaft, outside of the standards $U^3$ $U^3$, are located depending arms $U^4$ $U^4$, while between said standards is located a depending angular arm $U^5$, upon the forward end of which are pivoted at $u^4$ two jaws $U^6$ $U^6$. Two arms or links $u^5$ $u^5$ connect said jaws $U^6$ $U^6$ with the lower extremities of the depending arms $U^4$ $U^4$, as shown in Figs. 21, 22, and 24. A spring-catch V is arranged upon a stationary part of the carriage, so as to normally engage the lower end of one of the arms $U^4$ $U^4$, so that as the rock-arm U is rotated by its engagement with the stud $u$, thus moving the end $U^2$ forward, said spring V will operate to hold back the lower ends of the depending arms $U^4$ $U^4$, so as to cause the jaws $U^6$ $U^6$ to open as the end $U^2$ of the rock-arm moves forward and carries the angular arm $U^5$ forward. The angular arm $U^5$ is preferably made somewhat elastic, being formed from a flat strip of metal, as shown in the drawings, Figs. 22 and 24, and loosely secured to the shaft $u^2$ at its upper end. By this forward movement, therefore, the angular arm $U^5$ is caused to yield somewhat, and by the time the jaws $U^6$ $U^6$ have been advanced sufficiently to engage the twisted ends of the straw band the spring V has been bent so as to release the arms $U^4$ $U^4$, when, by the resiliency of the arm $U^5$, the arms $U^4$ $U^4$ will be rotated so as to close the jaws $U^6$ $U^6$ upon the twisted ends of the band, as shown by dotted lines, Fig. 24. A projecting bracket V' is located upon the standard O and is provided upon its lower side with a segmental rack $V^2$, arranged to engage the gear $u^3$ after the parts have moved into the position shown in dotted lines, Fig. 24. As the rock-arm U continues to revolve about the standard O the gear $u^3$, being in engagement with the segmental rack $V^2$, is revolved so as to rotate the arms $U^4$ $U^4$, as shown in Fig. 25, thus carrying the jaws $U^6$ $U^6$ upwardly and carrying the twisted ends of the band upwardly. A forwardly-projecting spindle $v^4$ is located upon the periphery of the segmental rack $V^2$, as shown in Figs. 21, 22, and 25, said spindle being extended slightly to one side of the center of the carriage C, so as to come upon one side of the twisted ends of the band, and the arrangement of the gears $u^3$ and $V^2$ is such that as said gear $u^3$ is rotated to carry the ends of the straw band upwardly said band is carried by the jaws $U^6$ $U^6$ around the forwardly-projecting spindle, as shown in the drawings, Fig. 25. During the operation of the mechanism just described the holding-jaws M M' are opened to release the ends of the band at the instant when the jaws $U^6$ $U^6$ grasp the twisted ends of said band by reason of the rollers $N^2$ and $N^5$, which control said jaws, being simultaneously engaged by cam projections $S^2$ $S^3$ upon the machine-frame. A second rock-arm $V^3$ is pivotally connected at $v'$ upon the bracket V′ on the standard O, said arm being curved at one of its ends, as at V⁴, and having a projecting arm V⁵ upon the other side of the pivotal support $v'$. A stud $v^2$ is located upon the under side of the platform, said stud being located in the path of the end V⁵ of the rock-arm V³, so that by the rearward movement of the carriage C said arm will be brought into engagement with said stud and said rock-arm be thereby rotated into the position shown in dotted lines, Fig. 21, and in full lines, Fig. 25. By this movement of the curved end of said rock-arm the said arm is caused to embrace the upturned ends of the band after they have been carried by the jaws U⁶ U⁶ into the position (shown in Fig. 25) around spindle $v^4$ on the bracket V′. The upward movement of the jaws U⁶ U⁶ carries the twisted ends of the band beneath the portion of the band which surrounds the bundle of grain. By the time the parts have assumed the relative positions shown in Fig. 25 the carriage C has moved rearwardly, so as to bring the end U² of the rock-arm U into engagement with the stud $u'$ on the machine-frame, so as to rotate said rock-arm in the other direction, thus rotating the gear $u^3$ in a direction to retract the jaws U⁶ U⁶. It is obvious from the construction before described that the arms U⁴ U⁴, being rotated by the shaft $u^2$, will, by their connection through the links $u^5$ with the jaws U⁶ U⁶, tend to open said jaws, so as to release the ends of the band, and the curved arm V⁴, being moved forward, as shown in Figs. 21 and 25, embraces the ends of the said band and prevents the accidental withdrawal of the same from beneath the band. As soon as the carriage C has moved rearwardly to a sufficient distance to effect the movements of the mechanism just described the extended end V⁵ of the rock-arm V³ escapes from its engagement with the stud $v^2$, and a spring $v^3$ serves to return said rock-arm to its initial position. In this condition the bundle is completed, and is carried rearwardly by the carriage C. The band is preferably applied to the bundle comparatively close to the butt-ends of the grain, as indicated in Fig. 5 by the dotted lines, in order to effectually secure any short stalks of grain which may form part of the bundle, or, where the field of grain consists partially or wholly of short grain, to enable such short grain to be bound equally as well as longer grain. The location of the band upon the bundle is, however, immaterial; and, if desired, the construction and arrangement of the mechanism for applying the band may be varied so as to apply the band farther from the butt-ends of the grain. One side of the carriage C is provided with gear-teeth W, arranged to come into engagement with a segmental gear W′, mounted upon a revoluble vertical shaft $w$ at the rear left-hand corner of the machine-frame and carrying upon its upper end arms W², adapted to engage the bundle by the rotation of said shaft $w$, so as to draw the bundle rearwardly and disengage the band from the spindle $v^4$ and to eject the bundle as it reaches the rear end of the platform. A spiral spring $w'$ is located about the lower end of the shaft $w$, being engaged at one end $w^2$ with a stationary part of the machine and at its other end $w^3$ with the shaft $w$, so that when the carriage C moves out of engagement with the segmental gear W′ said spring will operate to return the shaft $w$, with the arms W², to its initial position. The operations of the several parts of the mechanism are continued in the order described so long as the machine is in motion, the band being passed around and secured upon one bundle while the band for the next succeeding bundle is being formed, and after the completed bundle has been discharged the carriage C, moving in the track or guides about the margin of the platform, takes hold of the ends of the band and continues to travel forward against the cut stalks of grain, so as to gather the cut grain within the band, as before described.

In order to more firmly pack or compress the stalks together as the band is being secured about the bundle, a coiled spring X is located within a housing X′ upon the standard O, as shown in Figs. 5 and 6, said spring extending outwardly through a slot X² in said housing and connected at X³ with the binder-arm. When the binder-arm descends, as in Fig. 6, to deposit the end of the band within the jaw M′, the spring X is drawn downwardly about the bundle, and, by its elasticity, operates to compress the bundle and to relieve in a great measure the strain upon the band. When the binder-arm is raised, the spring X is recoiled within the housing X′. It will be seen that by these improvements I am enabled to provide a machine which, while it is entirely automatic in its operation, forms the band from a portion of the grain which is cut by the machine, the said band being formed and secured upon the bundle in substantially the same manner as the band would be formed and applied to the bundle by hand. By these improvements, therefore, the necessity of the employment of cord, wire, or other substance other than the grain which is being harvested is obviated and the grain thus kept in much better condition for use either for grinding or for feed, besides effecting a saving of the cost of such materials.

By the improved mechanism herein described the bundles are very securely bound and all liability of the band coming unfastened is obviated.

Having thus described the said invention of THOMAS URDAHL, deceased, what we claim as new, and desire to secure by Letters Patent, is—

1. In a grain-binding harvester, the combination, with mechanism for grasping a portion of the grain which is cut by the knives and forming a band from the same, of a carriage provided with means for grasping the ends of said band and arranged to travel across the front of the machine, so as to gather the cut grain within said band, and means upon said carriage for securing the band around the bundle, substantially as set forth.

2. The combination, in a grain-binding harvester, of band-forming mechanism adapted to grasp and tie the ends of a portion of the cut grain which falls upon the platform, a carriage provided with mechanism for grasping the ends of the band thus formed and arranged to move across the front of the machine in rear of the cutting-knives, means upon said carriage for elevating one end of said band above the level of the platform, and means upon said carriage for securing the ends of said band around the bundle of grain, substantially as set forth.

3. In a grain-binding harvester, the combination, with a band-forming device below the platform, of a marginal track around the platform, and a carriage arranged to travel upon said marginal track, said carriage being provided with mechanism for forming the bundle and mechanism for securing the band around the same, substantially as set forth.

4. In a grain-binding harvester, the combination, with the main driving-wheel, of mechanism below the platform of the binder for grasping and tying the ends of a portion of the cut grain to form the band, a track around the margin of said platform, a binder-carriage arranged to travel upon said marginal track, means for communicating motion from said main driving-wheel to said carriage, and means for throwing said band-forming mechanism into and out of operation, substantially as set forth.

5. In a grain-binding harvester, the combination, with the main frame and the driving mechanism, of a carriage located below the platform of the machine, said carriage being provided with jaws for grasping a portion of the cut grain and with mechanism for forming a knot in one end of the same, a marginal track around the platform, a carriage arranged to travel upon said marginal track and adapted to grasp the ends of the band thus formed, means upon said carriage for elevating one end of the band above the level of the platform, and means, also, upon said carriage for securing the said band about the bundle, substantially as set forth.

6. In a grain-binding harvester, the combination, with the main frame, the platform, and the main driving-wheel, of a track located beneath the platform of the binder and extending from front to rear of said frame, a carriage adapted to move upon said track, said carriage being provided with jaws for grasping a portion of the cut grain and with mechanism for forming a knot in the end of the same, means for advancing and retracting said carriage beneath the platform, and means for throwing the knot-tying mechanism into operation when it reaches the rear end of said track, substantially as set forth.

7. In a grain-binding harvester, the combination, with the main driving-wheel and the platform, of band-forming mechanism below the latter, a track arranged around the margin of the platform, sprocket-wheels located at each corner of said track, one of said wheels being operatively connected with the main driving-wheel, a chain or belt trained over said wheels, and a carriage permanently secured to said chain or belt and arranged to travel upon said track, said carriage being provided with mechanism for grasping the ends of the band and with mechanism for securing the band around the bundle, substantially as set forth.

8. The combination, in a grain-binding harvester, of a reciprocating carriage below the platform, provided with mechanism for grasping and tying one end of a portion of the cut grain which falls upon the platform to form the band, means for dividing the untied end of said band, a carriage provided with mechanism for grasping the divided ends of said band and arranged to travel across the front end of the machine, so as to gather the cut grain within said band, and means upon said carriage for securing the band around the bundle, substantially as set forth.

9. In a grain-binding harvester, the combination, with mechanism below the platform for forming a band from a portion of the cut grain which falls upon the platform, of mechanism for dividing the untied end of the band, a traveling carriage provided with means for grasping said divided ends and arranged to move across the front end of the machine in rear of the knives, means upon said carriage for passing the ends of the band around the cut grain to form a bundle, and means upon said carriage for securing said ends together, substantially as set forth.

10. In a grain-binding harvester, the combination, with a main driving-wheel and the main frame, of a track upon said frame below the margin of the platform, band-forming mechanism below the platform, a device for dividing the untied end of the band, a carriage arranged to travel upon said marginal track and operatively connected with the driving-wheel, means upon said carriage for grasping the divided ends of the band, means upon said carriage for elevating one of said ends above the level of the platform, means, also, upon said carriage for passing the ends of said band around the cut grain to form the bundle, means for securing said ends together, and means upon the machine-frame for throwing the said devices upon said carriage successively into and out of operation, substantially as set forth.

11. The combination, in a grain-binding harvester, of a reciprocating carriage below the platform, provided with mechanism for grasping and knotting one end of a portion of the cut grain, levers for giving a back-and-forth movement to said carriage, a track located below and adjacent to the outer margin of the platform, a traveling carriage adapted to move upon said track and carrying mechanism for grasping the ends of the band and for securing the same around the cut grain to form a bundle, and projections upon said levers arranged to move into the path of said traveling carriage upon opposite sides of the machine for the advancement and retraction of said carriage, substantially as set forth.

12. In a grain-binding harvester, the combination, with a reciprocating carriage below the platform, provided with mechanism for grasping and mechanism for tying one end of a bunch of grain or straw, and mechanism for dividing the untied end of said bunch of grain or straw, of a track located below and adjacent to the outer margin of the platform, sprocket-wheels at the several corners of said track, one of which wheels is operatively connected with the driving mechanism, a chain trained over said wheels, a carriage permanently connected with said chain and provided with an upwardly-extending standard carrying a pivoted arm, a jaw upon said carriage for grasping and holding one end of the band below the platform, jaws at the free end of said pivoted arm for grasping the other end of said band, means upon said carriage for raising and lowering said arm, and means, also, upon said carriage for opening and closing the jaws at the extremity of said arm, substantially as set forth.

13. In a grain-binding harvester, the combination, with the main frame and the main driving-wheel, of a track below the margin of the platform, a carriage adapted to travel continuously upon said marginal track and provided with mechanism for forming the bundle and for securing the band thereon, a continuously-revolving gear at the rear of the machine below the platform, a carriage below the platform, provided with mechanism for grasping and tying one end of a portion of the cut grain to form the band, and means located in the path of said continuously-traveling carriage for moving the band-tying mechanism into and out of engagement with said gear at the rear of the machine, substantially as set forth.

14. In a grain-binding harvester, the combination, with the platform, the driving-wheel, and the main frame, of mechanism for forming the band from a portion of the cut grain, a track extending around the main frame below and adjacent to the margin of the platform and carrying a jaw for grasping one end of said band, a vibrating binder-arm provided at its free end with jaws for grasping the other end of said band, means upon the frame for elevating said binder-arm, means upon the frame for depressing said binder-arm to pass the end of the band around the cut grain to form a bundle, a jaw upon the carriage for grasping said latter end of the band, means upon the frame for rotating said jaws, so as to twist said ends together, and means upon said carriage for tucking said twisted ends beneath the band, substantially as set forth.

15. In a grain-binding harvester, the combination, with the main frame and main driving mechanism, of a platform provided with an aperture in its forward end, a reciprocating carriage below said platform, provided with jaws for grasping the ends of a portion of the cut straw or grain and with jaws adapted to rotate about said grasping-jaws to tie said ends together, means upon said carriage for opening said rotating jaws, and means upon the machine-frame for opening said grasping-jaws after the knot has been tied, substantially as set forth.

16. In a grain-binding harvester, the combination, with the main frame and the main driving-wheel, of a track below the outer margin of the platform, a continuously-moving carriage upon said track provided with mechanism for grasping the ends of the band and securing the same about the cut grain to form a bundle, a reciprocating carriage below the platform, means in the path of the continuously-moving carriage for giving a back-and-forth movement to said reciprocating carriage, jaws upon said reciprocating carriage for grasping one end of a bunch of grain or straw, mechanism for tying a knot in said end, and mechanism operatively connected with said reciprocating carriage for dividing the untied end of said bunch of grain or straw and holding said divided ends in the path of said continuously-moving carriage, substantially as set forth.

17. The combination, in a grain-binding harvester, of mechanism for forming a band from a portion of the cut grain, a carriage adapted to grasp the ends of the band thus formed, means for giving a continuous motion to said carriage about the margin of the platform, means upon said carriage for securing the ends of the band around the cut grain to form a bundle, and means at the rear of the platform adapted for operation, by engagement with the said carriage, to eject the bundle, substantially as set forth.

18. In a grain-binding harvester, the combination, with band-forming mechanism, of a traveling carriage adapted to move about the outer margin of the platform and provided with mechanism for forming the bundle and for securing the band around the same, and a pivoted lever operated by the band-forming mechanism and provided with jaws adapted to grasp the ends of the band and to hold said ends in the path of jaws carried by said traveling carriage, substantially as set forth.

19. In a grain-binding harvester, the combination, with band-forming mechanism located below the platform, of a carriage arranged to travel around the outer edge of the platform, means for giving a continuous movement to said carriage, a revoluble plate upon said carriage and carrying gripping-jaws, means for passing the band around the cut grain to form a bundle and engaging the same within said jaws, means upon the frame for giving a rotary motion to said revoluble plate to twist said ends, an arm pivoted upon said carriage provided with jaws for grasping said twisted ends, means for releasing said first-mentioned jaws, and means upon the frame for giving a rocking movement to said pivoted arm, substantially as set forth.

20. In a grain-binding harvester, the combination, with the main frame, the platform, and the driving mechanism, of mechanism for forming the band, a carriage adapted to move across the front end of the platform and provided with a tubular standard or post carrying at its upper end a binder-arm, jaws upon the free end of said binder-arm, rack-bars extending upwardly through said standard or post, levers engaged with the lower ends of said rack-bars, pinions at the top of said standard for vibrating the binder-arm and for controlling the jaws upon the free end of the same, and cams upon the machine-frame for giving a vibrating movement to said levers, substantially as set forth.

In testimony that we claim the foregoing as the invention of the late THOMAS URDEHL we have hereunto set our hands, at Madison, in the county of Dane and State of Wisconsin, in the presence of two witnesses.

HERMAN T. LERDALL.
    MICHAEL JOHNSON.

Witnesses:
 DE WITT RAMSAY,
 H. B. DAHLE.